UNITED STATES PATENT OFFICE.

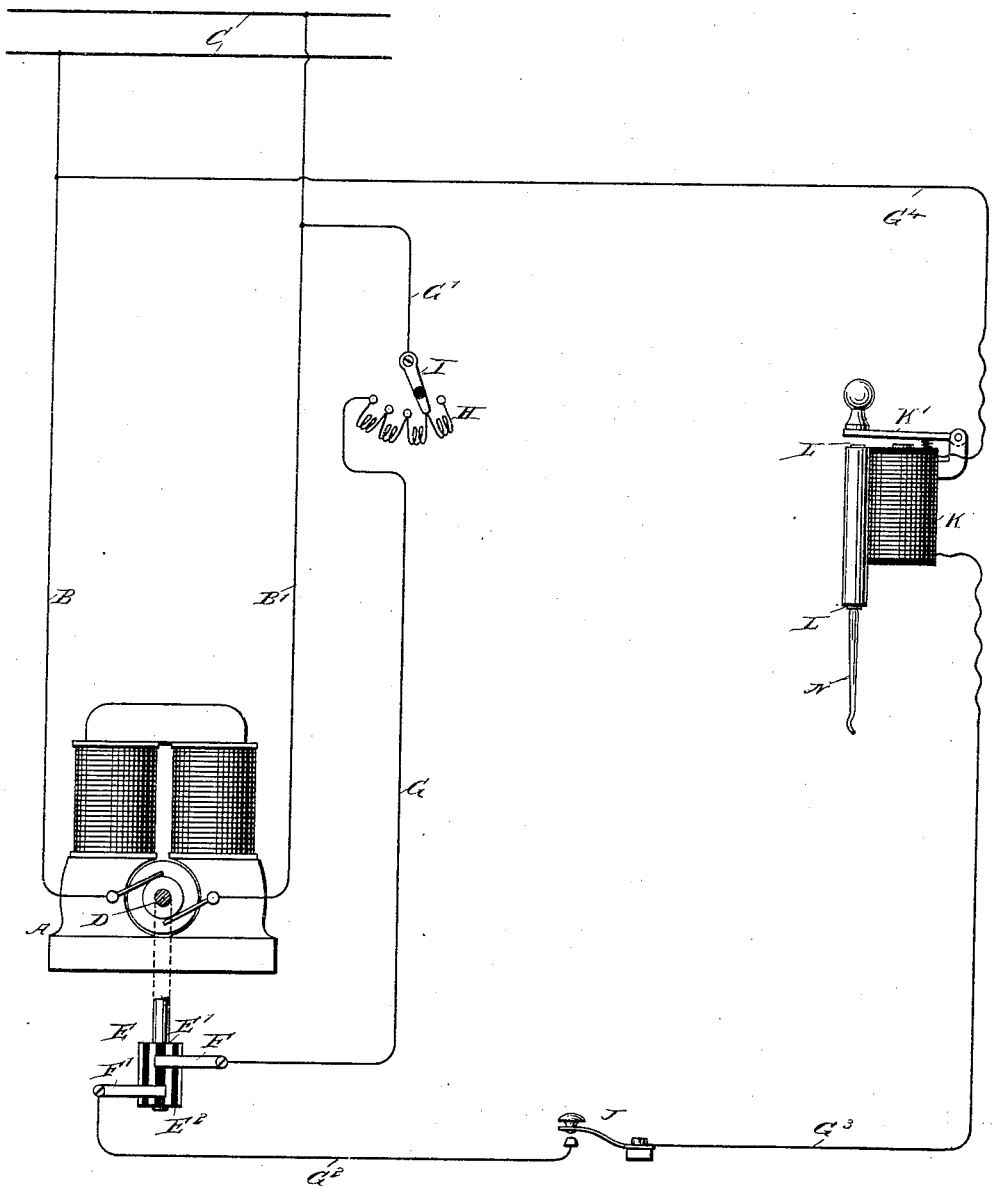

THOMAS W. ONDERDONK, OF NEW YORK, N. Y.

MEANS FOR TRANSMITTING ELECTRICAL ENERGY.

SPECIFICATION forming part of Letters Patent No. 557,422, dated March 31, 1896.

Application filed April 9, 1895. Serial No. 545,086. (No model.)

*To all whom it may concern:*

Be it known that I, THOMAS W. ONDERDONK, of New York city, in the county and State of New York, have invented certain new and Improved Means for Transmitting Electrical Energy, of which the following is a full, clear, and exact description.

The invention relates to electric motors, and its object is to provide certain new and useful means for transmitting electrical energy in a simple and very effective manner.

The invention consists principally of a motor-shaft provided with a circuit-breaker, an electromagnetic motor for operating a tool, and an electric circuit for the said motor and containing the said circuit-breaker.

The invention also consists of certain parts and details and combinations of the same, as will be fully described hereinafter, and then pointed out in the claims.

Reference is to be had to the accompanying drawing, forming a part of this specification, and which is a diagrammatic view of the improvement.

The electric motor A, of any approved construction, is connected by the wires B B' with the main-line wire C supplied with electricity from a central station. On the shaft D of the motor A is secured an insulated thimble E, provided in its periphery with metallic strips E' separated from one another by an insulating material $E^2$, as is plainly indicated in the drawing. On the peripheral surface of the thimble E contact the plates F F', adapted to simultaneously engage the metallic plates E and the insulating-strips $E^2$, so that a current can pass through the plates whenever the latter are in contact with a metallic strip E', but the current is broken whenever the said plates are on the insulating material $E^2$ between two adjacent plates E'.

The plate F is connected by a wire G with a resistance coil or rheostat H, of any approved construction, and provided with a switch I under the control of the operator to increase or decrease the resistance of the current passing to the wire G. The switch I is connected by a wire G' with the motor-wire B'. The other plate F' is connected with a wire $G^2$ adapted to be engaged by a treadle J under the control of the operator and connected by a wire $G^3$ with an electromagnet K connected by a wire $G^4$ with the other motor-wire B.

Now it will be seen that when the operator presses the treadle J and the contact-plates F F' are on the metallic strips E' then a current passes from the main-line wire C, the wires B B', and wire G', switch I, rheostat H, wire G, plate F, strip E', plate F', wire $G^2$, treadle J, wires $G^3$ and $G^4$ to the electromagnet K to actuate the same. At the same time the main wire C connected with the electric motor A operates the latter so that the shaft D is rotated and the circuit just described is broken as soon as the plates F F' pass from the strip E' on the insulating material $E^2$ to again open the circuit when the shaft D has sufficiently turned to cause the plates F F' to pass on the next strip E'.

Thus it will be seen that the circuit described is alternately opened and closed by the thimble E and plates F F', so that the electromagnet K is intermittently excited to alternately attract and release its armature K' adapted to operate the spring-pressed plunger L carrying the tool N, of any approved construction. Thus the tool N receives a reciprocating motion by the opening and closing of the circuit described, it being understood that the said opening and closing of the circuit takes place at the thimble E as long as the motor A is in motion and the treadle J is pressed.

When the operator desires to stop the reciprocating motion of the tool N, he simply releases the treadle J, so that the wires $G^2$ and $G^3$ are disconnected. Any desired degree of power can be transmitted to the electromagnet K by the operator changing the switch I on the rheostat H accordingly.

It will be seen that by the arrangement described the electromagnet K is wholly independent in its action of the motor A, and consequently far better results are obtained. It will further be seen that this device can be readily employed in dental work, rock-drilling, &c.

Having thus fully described my invention, I claim as new and desire to secure by Letters Patent—

1. The combination, with an electric circuit having an intermitting device therein, of a dental tool-holder comprising an electromagnet in said electric circuit, a tool-holder mounted to reciprocate on the electromagnet, an armature having pivotal connection with the electromagnet and serving as a hammer to drive the tool-holder in one direction, and a spring for returning the armature, substantially as specified.

2. The combination with a reciprocating tool and an electromagnet and armature for causing the reciprocations in one direction, of an electric circuit, a motor in said circuit, a thimble on the shaft of said motor comprising alternating metallic and insulating strips, a second electric circuit connected with the first-named circuit and with the electromagnet of the tool, contact-plates in the second circuit engaging with the thimble, whereby an intermittent current is transmitted to the tool-magnet and a rheostat in said second circuit, whereby the force of the reciprocations of the tool may be regulated, substantially as specified.

THOMAS W. ONDERDONK.

Witnesses:
 GEO. W. BUSH,
 SETH M. MEEK.